July 8, 1924.
E. ROTH ET AL
1,500,337
PUNCH PRESS GUARD MECHANISM
Filed March 30, 1922
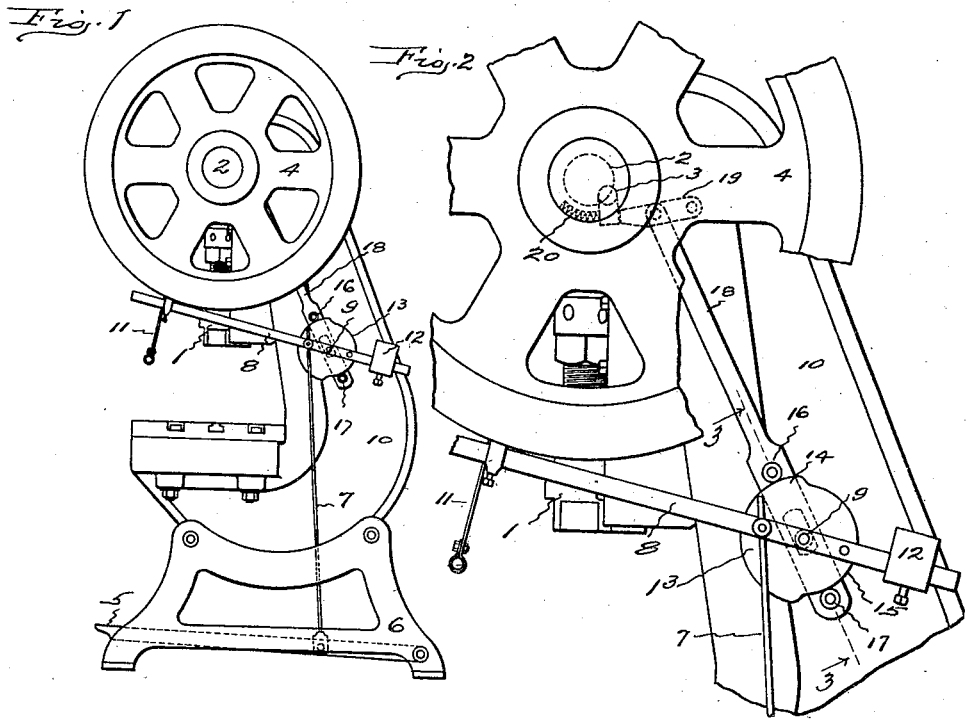
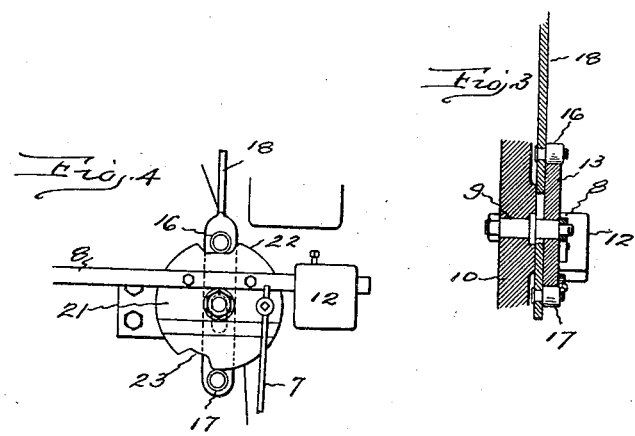
INVENTORS.
Emil Roth +
Edward P. Elzy, by
Harry R. William
ATTORNEY Patented July 8, 1924.

1,500,337

UNITED STATES PATENT OFFICE.

EMIL ROTH, OF CLEVELAND, OHIO, AND EDWARD P. ELZY, OF HARTFORD, CONNECTICUT, ASSIGNORS TO THE AETNA LIFE INSURANCE COMPANY, OF HARTFORD, CONNECTICUT, A CORPORATION OF CONNECTICUT.

PUNCH-PRESS GUARD MECHANISM.

Application filed March 30, 1922. Serial No. 548,225.

*To all whom it may concern:*

Be it known that we, EMIL ROTH, a citizen of the United States, residing at Cleveland, in the county of Cuyahoga and State of Ohio, and EDWARD P. ELZY, a citizen of the United States, residing in Hartford, in the county of Hartford and State of Connecticut, have invented a new and useful Improvement in Punch-Press Guard Mechanisms, of which the following is a specification.

This invention relates to those mechanisms which are designed to be applied to power driven punch presses for preventing the operatives from becoming injured by the action of the punches. These mechanisms are commonly arranged so that upon the depression of the starting treadle a guard is first caused to move into protecting position in front of the work and the punch, and then the clutch is released and allowed to connect the driving pulley with the crank shaft for reciprocating the punch.

The object of the present invention is to provide a very simple and cheap mechanism that can be readily and quickly applied to the punch presses in general use, which mechanism is so designed that the guard and clutch control are positively connected and caused to co-operate in such manner that it is impossible for the clutch to connect the driving pulley with the crank shaft until after the guard is moved into protecting position.

In attaining this end in the embodiment of the invention illustrated, the guard carrying lever which is oscillated by the depression of the starting treadle is fastened to a cam that is arranged to reciprocate the clutch control bar, the cam being shaped so as to absolutely control at all times the relation between the guard lever and clutch bar, whereby the guard is positively lowered before the clutch is engaged.

In the accompanying drawings Figure 1 shows a side elevation of a punch press provided with a guard mechanism which embodies the invention. Fig. 2 shows on larger scale the improved guard mechanism. Fig. 3 is a section on the plane indicated by the dotted line 3—3 on Fig. 2. Fig. 4 shows a side view of a modified arrangement of the guard mechanism.

The punch press shown is of an ordinary type and the punch slide 1 is reciprocated down and up in the usual way by the crank shaft 2 when the clutch 3 of well known form connects the crank shaft with the driving pulley 4, which runs loosely on the crank shaft when the clutch is disengaged as is generally understood.

The starting treadle 5 which is pivoted to the base 6 is connected by a rod link 7 with a lever 8 that is pivotally mounted on a stud 9 projecting from the side of the frame 10. On the front end of this lever is the arm 11 adapted to carry a guard of any approved design. On the rear end of the guard lever is a counterbalancing weight 12. The guard lever is fastened to a cam disk 13 that is rotably mounted on the stud 9. This cam has a high section 14 and a low section 15. Engaging diametrically opposite sections of the cam are rolls 16 and 17 mounted on the bar 18 which near its lower end is slotted so that it may move freely longitudinally on but be guided in its movement by the stud 9. The upper end of this bar is pivotally attached to the clutch control arm 19.

With this mechanism when the treadle is depressed the front end of the guard lever is drawn down and the guard carried by the lever brought into protecting position in front of the punch and the work. As the guard is drawn down the cam is rotated. The cam and rolls on the bar are so related that during the first period of the movement of the cam, the bar which is connected with the clutch control arm is not moved, the cam turning between the rolls without reciprocating the bar. After the guard has reached protecting position the cam becomes turned so far that the lower roller on the bar rides onto the high section of the cam and the upper roller on the bar rides onto the low section of the cam and the bar is drawn down. This movement of the bar releases the clutch in the manner well known so that the spring 20 will cause the clutch to connect the driving pulley with the crank shaft and the punch to be reciprocated.

The type of clutch forms no feature of the invention. That above referred to is released for connecting the driving wheel and shaft by the downward movement of the bar. If the clutch is one that is released by the upward movement of the bar the only change that is necessary is in the form of the cam that is connected with the guard lever and that reciprocates the clutch bar. This is illustrated in Fig. 4. In this case the treadle link 7 is shown as attached to the cam 21 so that on depressing the treadle the cam is turned over to the front for bringing the guard lever down. This cam has high sections 22 and low sections 23, and it is so timed with relation to the rolls 16 and 17 on the clutch bar that when the cam is turned over to the front by the upward movement of the treadle link the clutch bar is lifted for releasing the clutch.

In both mechanisms illustrated there is a positive connection through the cam, between the guard lever and clutch bar so that the guard will be brought down before the clutch is released.

The invention claimed is:

1. A punch press guard mechanism comprising a cam, a clutch bar bearing rolls in engagement with opposite sides of the cam, a lever attached to the cam and adapted to carry a guard, and a link connected with the cam and adapted to be connected with an operating treadle.

2. A punch press guard mechanism comprising an oscillatory guard carrying lever, a reciprocatory clutch controlling bar, and a cam forming a positive connection between said lever and bar whereby the rotation of the cam first causes the oscillation of the lever and then the reciprocation of the bar.

EMIL ROTH.
E. P. ELZY.